Oct. 25, 1927.  1,646,768
A. E. SCHRUTH ET AL
DRAFT EQUALIZER
Filed Feb. 19, 1927   2 Sheets-Sheet 2
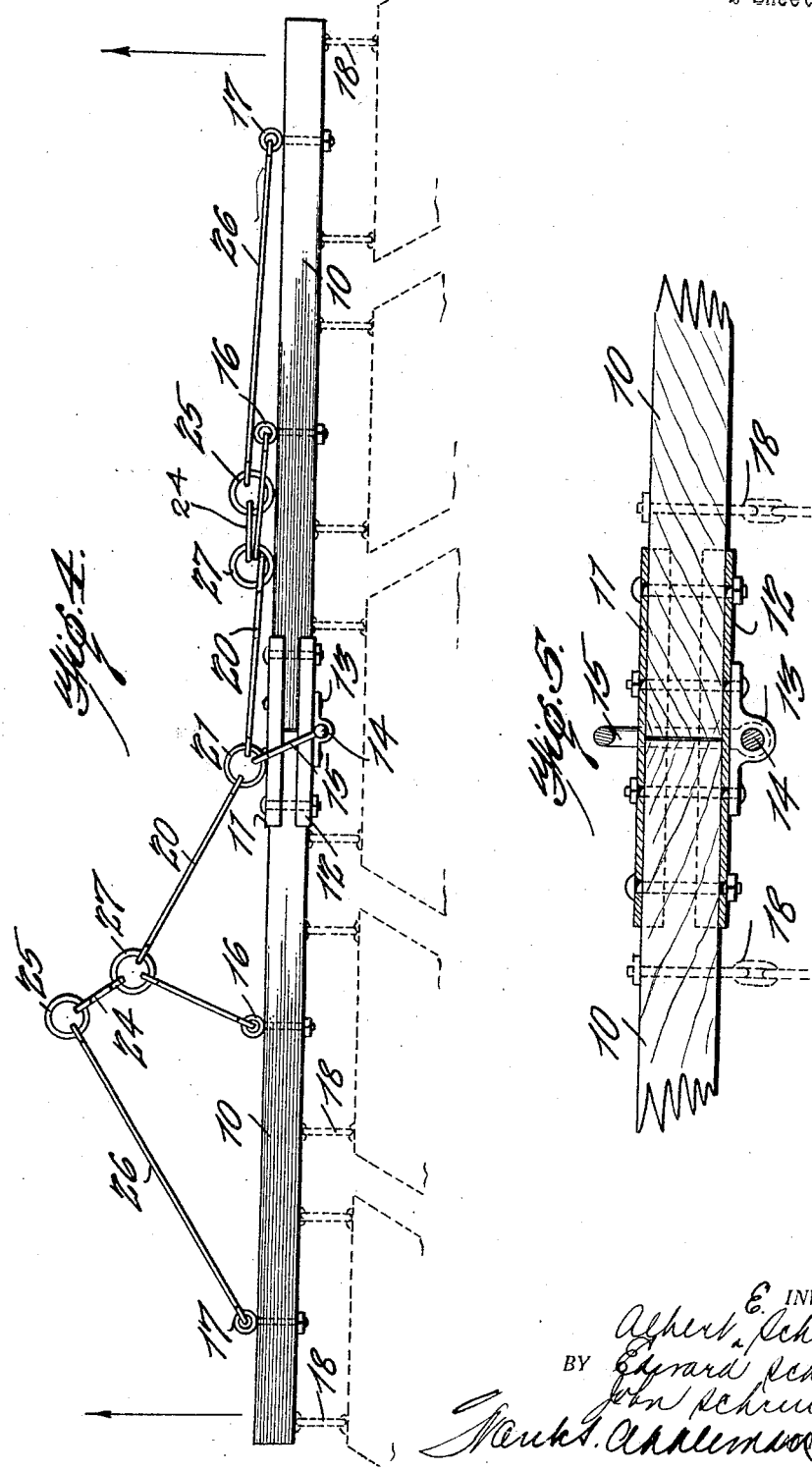

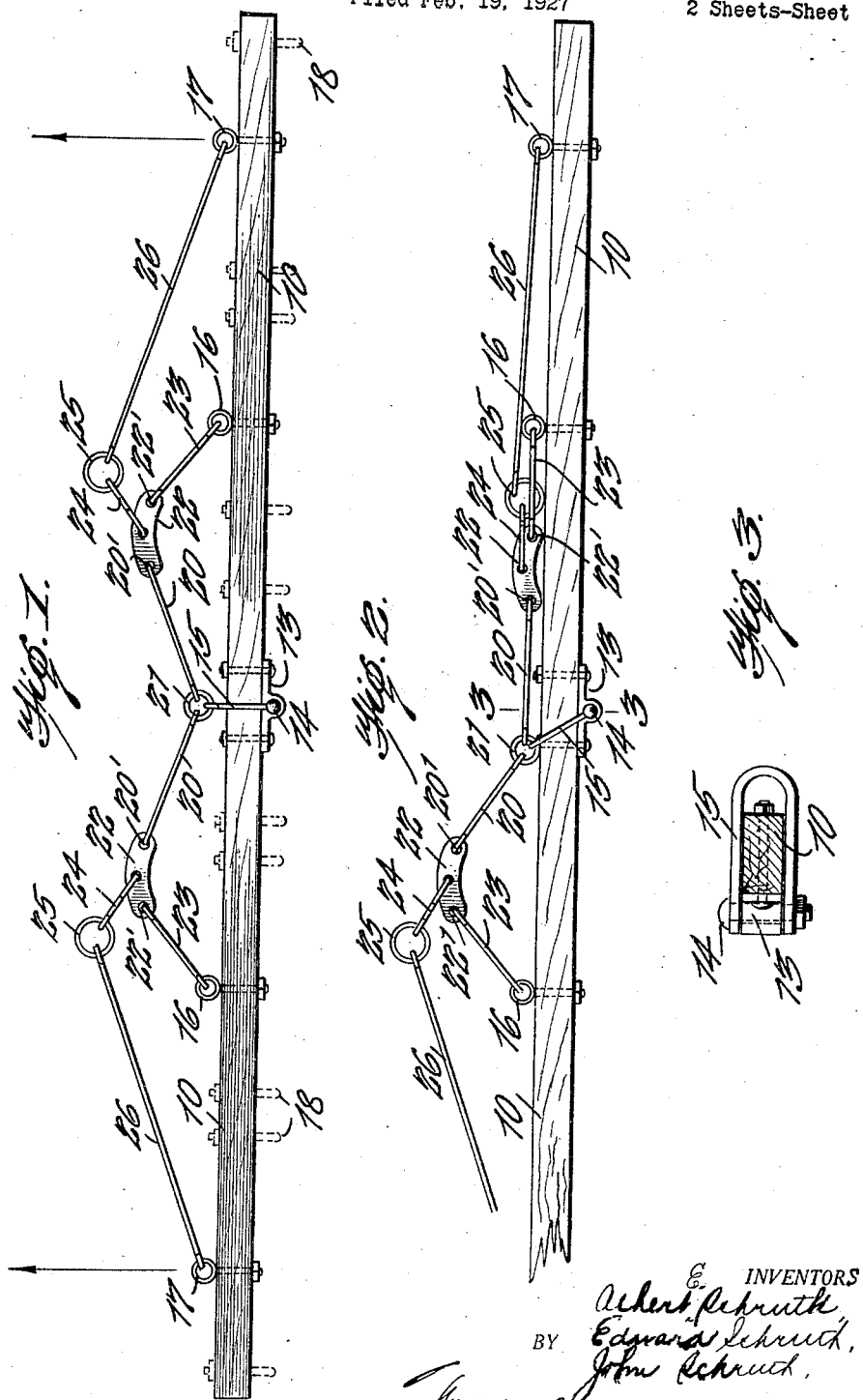

Patented Oct. 25, 1927.

1,646,768

UNITED STATES PATENT OFFICE.

ALBERT E. SCHRUTH, EDWARD SCHRUTH, AND JOHN SCHRUTH, OF PEPIN, WISCONSIN.

DRAFT EQUALIZER.

Application filed February 19, 1927. Serial No. 169,646.

This invention appertains to certain new and useful improvements in draft equalizers or eveners, and has for its object to provide a "harrow hitch" of such construction as to obviate the use of flexible connections as chains, and guide rollers which are objectionable in use, such objectionable features being avoided by the use of an oscillatory clevis or loop that is pivotally connected to the drag beam of the hitch.

The invention consists in providing a draft evener having a plurality of associated links which are movably connected to a drag bar and to each other, the movement of the attached parts to and from the drag bar maintaining whiffletrees nearly in the line of draft and without unduly crowding the teams, as lateral movement will be restricted by a centrally located and oscillatory clevis or loop which is attached to the drag bar by means of a fixture, which locates a bolt upon which it is pivoted rear of the drag bar.

The invention consists in the combination of a clevis which is pivoted in the rear of the drag bar, said clevis having a loop or ring which is engaged by links, the links being connected with other links which are connected to equally spaced eye-bolts maintained by the drag bar, as will be hereinafter set forth.

In the accompanying drawings,—

Figure is a plan view of a draft evener made in accord with my invention;

Figure 2 is a plan view showing position of the parts when one of the teams is in advance of the other;

Figure 3 is a detail sectional view on the line 3—3 of Fig. 2;

Figure 4 is a plan view of a modification; and Figure 5 is a detail sectional view, showing channel irons for connecting a centrally divided drag bar.

The drag bar or drag beam 10 may be made of one piece, or in two pieces, each of the same length, as illustrated by Figures 4 and 5, and when made of two pieces, they are joined by plates 11 and 12 having flanges which overlie the front and rear edges of the drag bar. Each of the plates or channel irons is apertured for the passage of bolts. The bolts near the abutting ends of the drag bar hold in place a block 13 that has a rearward extending portion which is apertured to receive a bolt 14 that holds a clevis 15 in swinging engagement with the block. When the drag bar is of a single piece, the block 13 may be secured in place by bolts, as shown by Figs. 1, 2 and 3.

The drag bar has attached thereto eye-bolts 16 which are equally spaced to be positioned on opposite sides of the drag bar the same distance from the bolt 14 for the clevis and also similar eye-bolts 17 positioned at the same distance from the eye-bolts 16 as said eye-bolts are positioned from the bolt for the clevis. The spacing of the eye-bolts 16 and 17, to which the evener means are attached, provides for a four horse equalizing harrow hitch. The drag beam is provided at its rear edge with spaced eye-bolts 18 for connecting harrows with the drag bar, as indicated by dotted lines forming part of Figure 4 of the drawings.

As heretofore stated, the eye-bolts 16 and 17 are equally spaced and the eyes or openings thereof are of such area as to permit play or movement of looped ends of links which engage therewith. The hitch consists of a pair of substantially rigid links or link bars 20, 20, the ends engaging the clevis 15 or a ring 21 connected thereto. The links 20, 20 engage plates 22, 22, which are preferably curved, such plates having therethrough apertures located adjacent to their ends and central apertures. The aforesaid links 20, 20 engage the plates 22 by being passed through end apertures 20', 20'. The apertures 22' at the opposite ends of the plates are engaged by one of the ends of links 23, 23, the opposite ends of said links engaging the eye-bolts 16, 16. The plates 22, 22 are engaged centrally by links 24, 24, the end loops being passed through the central apertures, the opposite ends of the links 24, 24 engaging rings 25, 25, which are also engaged by links 26, 26, the loops on the opposite ends thereof encircling the eye-bolts 17, 17, which are attached to the drag bar 10 near the outer ends thereof.

The looped ends of the links provide elongated openings particularly at the points where they engage the rings and the eyes of the eye-bolts and the clevis engaging ring. As shown by Figure 4, rings 27, 27 may be used instead of curved and apertured plates 22, 22, as they may be considered as equivalents one of the other, both providing three point connecting means. The end apertures through the curved plates are out of line with the central apertures and maintain the links on different planes, as shown by Fig. 2.

In use, the rings 25, 25 are connected to whiffletrees in the usual manner, said whiffletrees having the usual singletrees, the device in its entirety providing a two team or four horse equalizer.

Though the hitch has been set forth as an equalizing harrow hitch, its use is not limited solely to such use, as the same may be used in connection with other implements than harrows, for instance, it may be used with one or a pair of tractors for draft purposes or with gang plows or cultivators.

It will be noted that both forms of the construction shown provide three point connections at three different points, to wit: at the swinging clevis, the plate or ring, and at the draft point to which the whiffletrees are attached.

We claim:

1. In a four horse draft equalizer, the combination with a drag beam, of a clevis mounted for oscillation at the center of the beam and beyond the rear edge thereof, and like draft connections on opposite sides from the center of the beam which engages with said clevis.

2. In a four horse draft equalizer, a drag beam, an oscillatory clevis which is pivotally connected centrally to the drag beam at a point beyond the rear edge of the beam, eye-bolts attached to the beam and spaced at equal distances from each other and from the pivotal point of connection of the clevis with the beam, and non-flexible links which engage with the eye-bolts, the clevis and with non-flexible means for connecting the links.

3. In a four horse equalizer, the combination with a drag beam, of an oscillatory clevis attached centrally and beyond the rear edge of the beam, rigid link-bars associated with the clevis and with a plurality of rigid link-bars which are connected to the drag beam and with draft rings, the parts being organized so that movement of the draft rings to and from the drag beam will effect oscillation of the clevis.

4. In a four horse draft equalizer, a clevis maintained in oscillatory engagement with the center of a drag beam beyond the rear edge thereof, two pairs of link-bars connected on opposite sides of the longitudinal center of the beam, single link-bars which extend from points adjacent to opposite ends of the beam, means for connecting the several link-bars with draft rings, the parts being assembled to effect oscillation of the clevis by a change of the position of the draft rings relative to the drag beam.

5. In a four horse equalizer, the combinatoin with a drag beam, of a clevis maintained in oscillatory engagement with the beam, pairs of converging rigid link-bars attached to the beam, means comprising draft rings, and connections which are connected with link-bars that extend therefrom to the clevis, the assembling means comprising three point connections at the clevis and link-bars.

6. The combination with a drag beam, of a four horse draft equalizer comprising a clevis which extends over the beam and is maintained in oscillatory engagement therewith, the point of connection being rear of the beam, a pair of equally spaced eye-bolts located on opposite sides of the pivotal point of the clevis with the beam, link-bars engaging at their rear ends the eye-bolts and the clevis, draft rings associated with said link-bars, short link-bars which extend from the draft rings to coupling means for the short link-bars, and longer link-bars which engage the eye-bolts next to the clevis and with the clevis.

7. A four horse equalizer comprising a drag beam, a clevis pivotally connected to the beam beyond its rear edge and extending over the beam, two similar sets of equalizing link-bars, each comprising four link-bars located on opposite sides of the center of the beam, and three point connections for the link-bars, including the clevis and draft hooks of whiffletrees.

ALBERT E. SCHRUTH.
EDWARD SCHRUTH.
JOHN SCHRUTH.